United States Patent Office 2,913,062
Patented Nov. 17, 1959

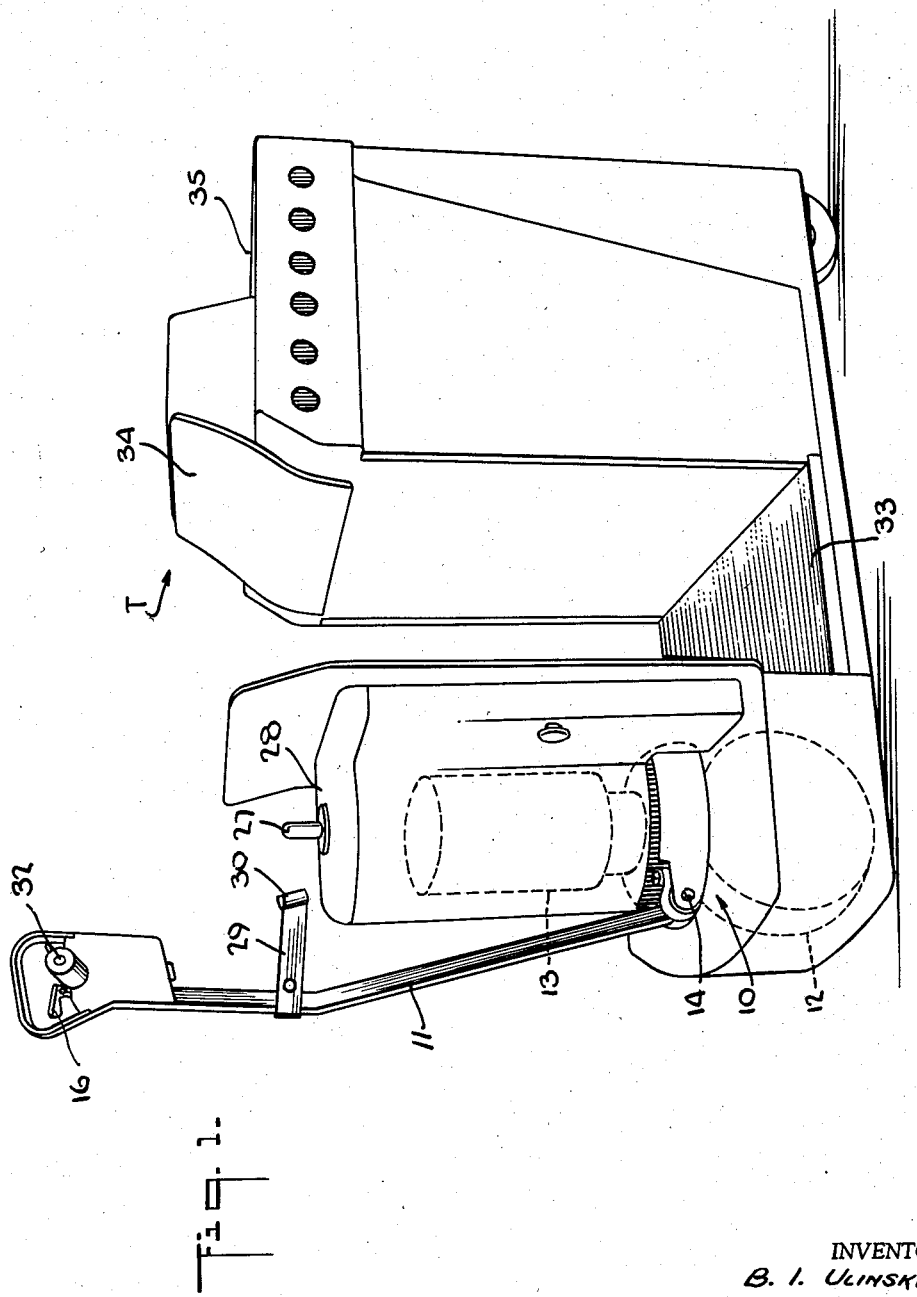

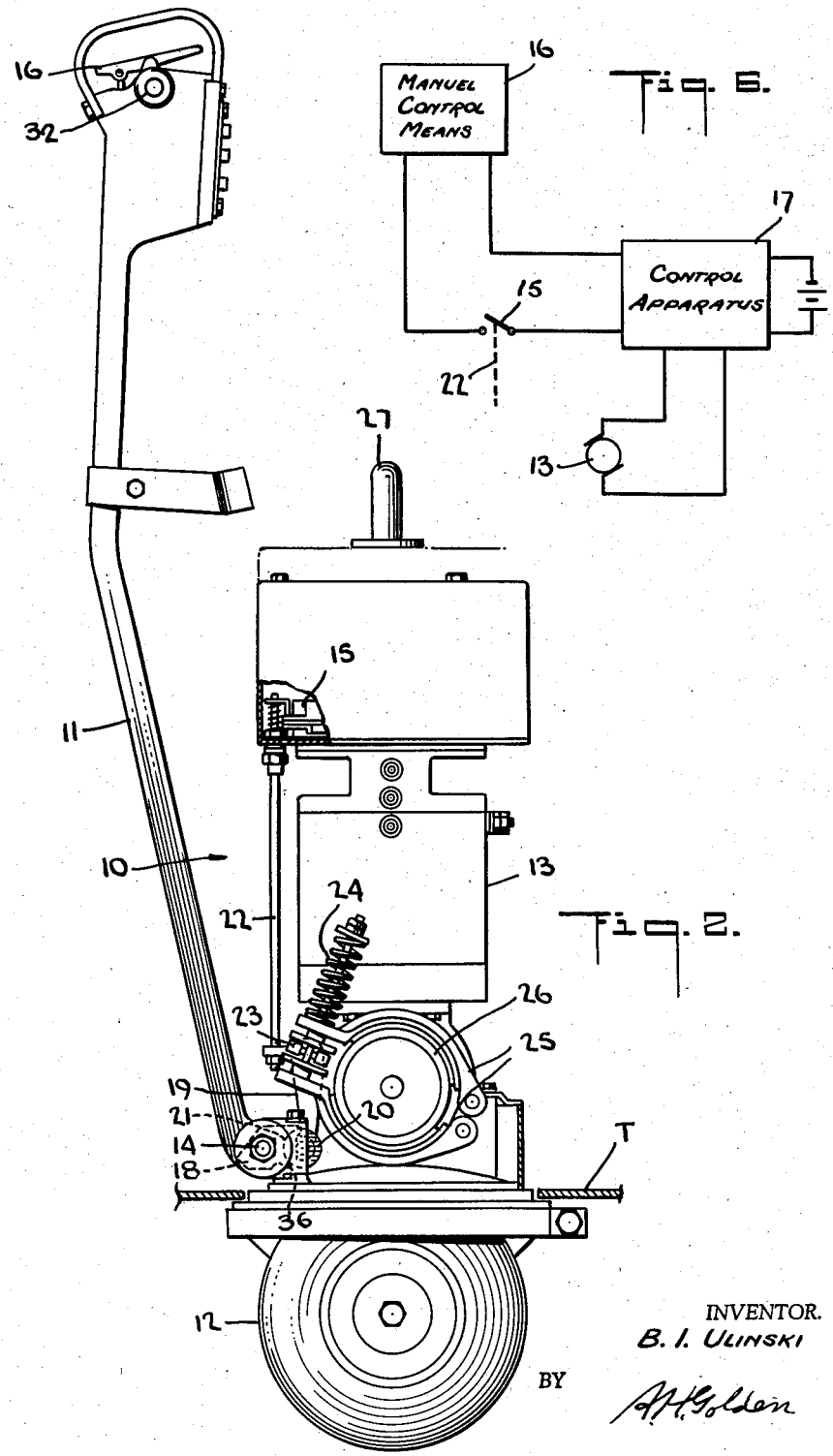

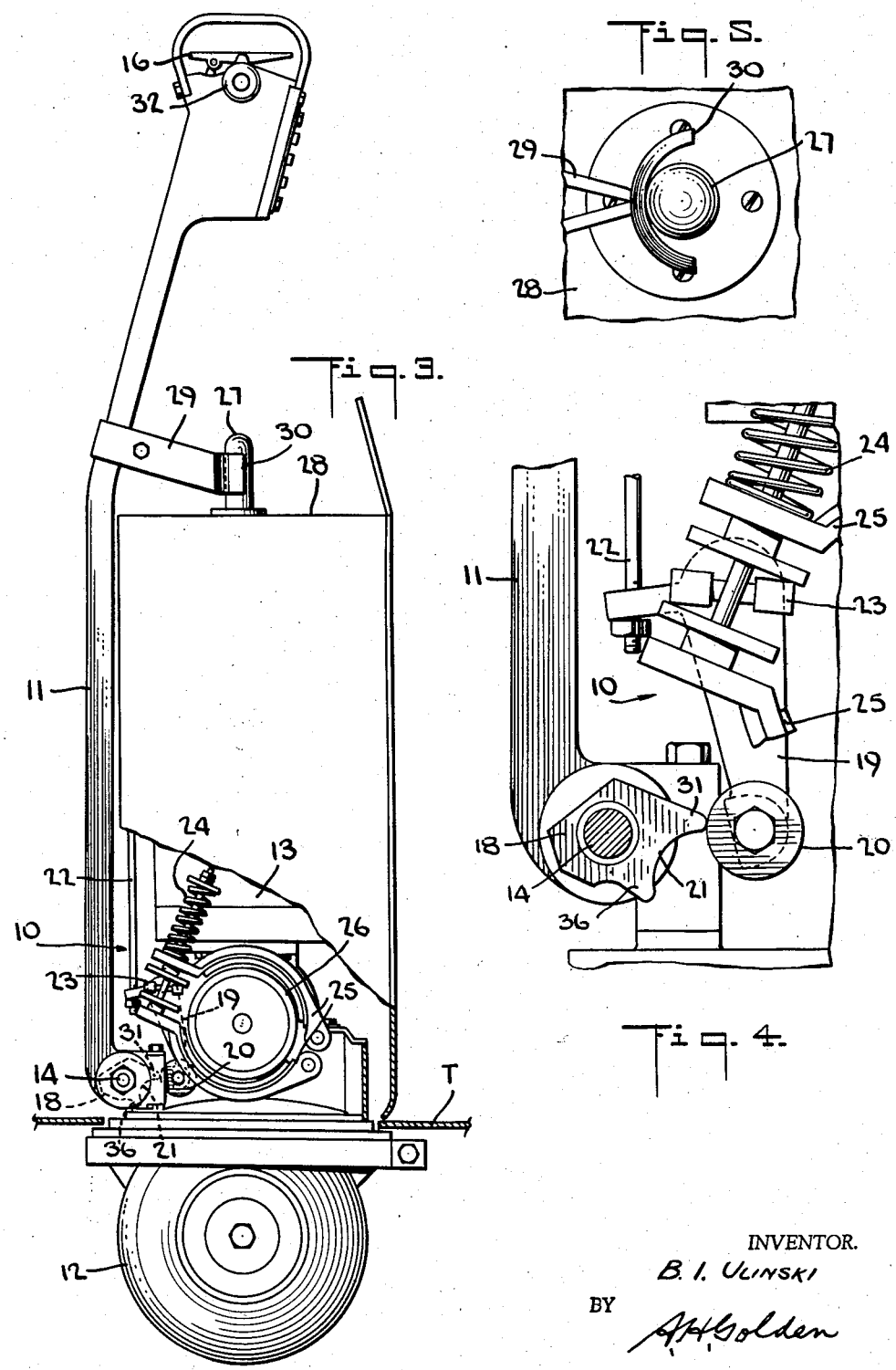

2,913,062

RIDER OPERATED CONTROL FOR PEDESTRIAN TRUCK

Bronislaus I. Ulinski, Flossmoor, Ill., assignor to The Yale and Towne Manufacturing Company, Stamford, Conn., a corporation of Connecticut Application December 3, 1957, Serial No. 700,344

15 Claims. (Cl. 180—13)

This invention relates to industrial trucks, and, more particularly, to industrial trucks of the type in which a traction motor is controlled by a vertically swinging steering handle adapted to be manipulated by an operator walking in front, or at the rear of the truck. Trucks of the particular class are generally termed "walkie trucks" since the operator walks in front, or at the rear of the truck and operates the truck through manipulation of the steering handle. Circuit control means for the traction motor are actuated through the vertical swinging movement of the handle as well as through control means at the end of the handle.

In a preferred form of this type of truck, the circuit control that is actuated by vertical swinging of the handle will act, when the handle moves to a fully lowered substantially horizontal position, to open the traction circuit so that the truck stops. Preferably, this movement of the handle also effects the application of the brake of the truck. When the handle is moved upwardly to a vertical position, the traction circuit is again opened and the brake applied. It will be realized that the handle, in some trucks of the type we are considering, may not be exactly vertical when it opens the traction circuit, and therefore I shall refer hereafter to a substantially vertical position of the handle. In a zone intermediate the two positions described, the brake is released and the traction circuit is closed so that the truck can be operated through the control means at the end of the handle. Those skilled in the art will appreciate that this control of the truck is extremely important since it makes possible to insure the stopping of the truck when the handle is moved into a horizontal position, or into its substantially vertical position, movements that will occur most naturally when the operator is in particular positions relatively to the truck.

In trucks of the particular class, it is preferred that the operator walk rather than ride on the truck, but it is difficult to control the actions of the operator, and in many instances the operator will sit on a front part of the truck, such as the battery compartment, and will ride from place to place. While so riding, the operator will tilt the steering handle forward from its substantially vertical position into that zone in which the traction circuit is closed. Such movement of the handle is difficult to attain, so that the operator sitting on the truck is frequently placed in a dangerous position.

I have conceived a construction to be used in a truck of this particular class, this construction facilitating the driving of the truck by a seated operator, while in no wise interfering with the normal operation of the truck as a "walkie" type vehicle.

As a feature of my invention, I mount my steering and control handle so that it will normally move between a substantially horizontal position and a substantially vertical position, as is standard in the art. However, the handle is adapted to move beyond its substantially vertical position further toward the truck into an even more vertical position, or perhaps, a position beyond the vertical in a rearward direction. When so moved, the handle will re-establish the traction circuit and will release the brake. Therefore, when the operator rides the truck, he has only to bring the handle toward the truck and toward himself. Through this movement, he establishes the traction circuit and releases the brake. He is now ready to drive the truck and to steer the truck through the handle. By moving the handle back toward its substantially vertical position, the brake is applied and the traction circuit is closed.

As a further, more detailed feature of the invention, means are provided to hold the steering handle against movement toward the truck from its normal, substantially vertical position. As a further detail of this part of the invention, the means are yielding, and are preferably in the form of a spring stop. Thus, the handle may be moved to a position to close the traction circuit and will normally move back again to its substantially vertical position to open the traction circuit upon release by the operator.

Referring now to the drawings:

Fig. 1 shows a perspective view of a truck that utilizes my invention.

Fig. 2 shows my invention on the steering and traction unit of the truck.

Fig. 3 is somewhat like Fig. 2, but shows the steering handle swung toward the truck in position to be utilized by an operator while riding the truck.

Fig. 4 is a detail view showing parts of my invention with the steering handle in the position shown in Fig. 3.

Fig. 5 shows a plan view of the handle support.

Fig. 6 shows diagrammatically a traction circuit for the truck.

For the purpose of describing my invention, I show in Fig. 1 a truck T of the "walkie" type that has a steering and traction unit 10, with a steering handle 11 whereby the unit 10 is rotated bodily in a steering axis to steer the truck. Those persons skilled in the art will understand that the steering and traction unit 10 includes a steering and traction wheel 12 and a traction motor 13 driving that wheel, shown in dotted lines in Fig. 1.

As is usual in trucks of the particular class, the steering handle 11 is mounted for vertical swinging movement on steering and traction unit 10, as through a pivot 14, with that movement utilized to condition an electric traction circuit for the motor 13. Merely for purposes of disclosure, I show the traction circuit diagrammatically in Fig. 6, with suitable switch means 15 that are actuated by the vertical swinging of handle 11 as I shall presently describe. The switch means 15 are connected in series with manual control means 16, Fig. 6, the arrangement being a usual one whereby the traction circuit when conditioned through switch means 15 will enable the manual control means 16 to act through control apparatus 17 to control motor 13. The manual control means 16 are mounted on the end of steering handle 11, Figs. 1, 2 and 3, and may very well be like those I described in my Patent No. 2,790,879, but that is not essential. I believe it will be unnecessary to describe further details of the traction circuit, since those details are not important to an understanding of my invention. It is merely necessary to know that the circuit has two control points, one of which is controlled through vertical swinging of steering handle 11, and the other of which is controlled through manual means 16.

In the exceedingly novel construction that I have conceived by my invention, I prefer to utilize for controlling the switch means 15 an actuating member or cam 18, Figs. 2, 3 and 4, that rotates with the vertical swinging movements of the steering handle 11. I form the actuating member 18 with a dwell 21, best seen in Fig. 4, against which a spring-pressed control lever 19 or roller 20 on that lever will move when the steering handle 11 moves to a substantially vertical position, shown in Fig. 2. In the particular construction that I have chosen to illustrate, the spring-pressed control lever 19 is arranged like that shown in my earlier application No. 564,421 filed February 9, 1956, now Patent No. 2,840,175, with a rod 22, Fig. 2, through which lever 19 actuates the switch means 15. As roller 20 moves against dwell 21, the lever 19 acting through rod 22 will effect movement of the switch means 15 to a position opening the traction circuit. Also, as in my earlier application, a cam 23 on lever 19 will rotate as the lever moves against the dwell 21. That cam 23 coacts with brake shoes 25, and by rotating will enable a coil spring 24 to move brake shoes 25 into braking engagement with a brake drum 26 on the steering and traction unit 10, as in Fig. 2. Of course, in that construction it is the spring 24, acting through brake cams 23, that presses control lever 19 toward actuating member 18.

It is extremely important to realize that the spring pressure of lever 19, acting against the dwell 21 on actuating member 18, will be effective to hold the steering handle 11 in its substantially vertical position, Fig. 2. Thereby I contribute a yielding stop that will hold steering handle 11 in a position with the traction circuit open and the brake applied. Nevertheless, by yielding, the lever 19 will enable steering handle 11 to move toward an even more vertical position, or beyond the vertical in a rearward direction, that is, from the Fig. 2 position to the Fig. 3 positon.

I equip the truck T with a limit stop 27, Figs. 3 and 5, that will limit the rearward movement of handle 11 that is incidental to the yielding of control lever 19. In the construction that I prefer, I utilize for the limit stop 27 a shaft that is mounted on a cover 28 extending over the steering and traction unit 10, that shaft being positioned in the steering axis of the unit 10. I then equip the steering handle 11 with a bracket 29 having a bearing portion 30 that will move against the stop or shaft 27 as handle 11 moves toward the truck and into its rearward position, shown in Fig. 3. Thus, the stop 27 will act as a support for steering handle 11 when the handle is in that rearward position.

I shall now call particular attention to the fact that the actuating member or cam 18 has a cam portion 31 that is just above the dwell 21, as viewed in Fig. 4. That cam portion 31 will effect a predetermined movement of control lever 19 against its spring pressure, as in Figs. 3 and 4, when the steering handle 11 moves against its support 27. The arrangement is such that, with steering handle 11 against the support 27, the control lever 19 will act through the brake cam 23 to hold the brake shoes 25 in release position, and also will hold switch means 15 in position to condition the traction circuit for operation. Naturally, the truck operator can then control the traction circuit through the manual control means 16 on handle 11. It will be appreciated that this enables the truck operator readily to drive the truck while riding on the truck.

That is because the steering handle 11 will be brought toward the operator when moved against limit stop or support 27, with the handle 11 and its manual circuit control 16 in position to be very readily manipulated by the operator. The steering of the truck can be easily accomplished while grasping the steering handle 11 or transverse hand grips 32 on the handle, since handle 11 can rotate in the steering axis with its bearing bracket 30 in contact with the handle support 27.

In Fig. 1, I do incidentally show the truck T constructed with an operator's platform 33 and seat 34, that are arranged in a forward position relatively to a battery compartment 35. That arrangement will be convenient for an operator who rides on the truck while driving the truck, but actually is not an important part of my invention. It is to be understood that my novel handle control can be utilized to very great advantage on those trucks having a forward battery compartment that is juxtaposed to the steering and traction unit, and on which the operator may ride.

It will be seen when considering Fig. 4 of the drawings that I form the actuating member or cam 18 with a further cam portion 36. That cam portion 36 will act, when steering handle 11 is in a zone between vertical and horizontal positions, to move control lever 19 whereby to effect release movement of the brake shoes 25 and the actuation of switch means 15. With handle 11 in horizontal position, cam position 36 will move past control lever 19 whereby to effect braking movement of the brake shoes and to open the traction circuit. The operation of the cam portion 36 is similar to that described in my application No. 564,421 to which I have already referred, and I believe it will be unnecessary to describe that operation in further detail.

I believe that those persons skilled in the art will now understand that I have conceived an extremely novel control for an industrial truck of the "walkie" type. Through that control, an operator can control the truck in a normal fashion while walking ahead of the truck. Nevertheless, it is possible through my invention for the operator to have complete control over the movements of the truck while riding on the truck. Moreover, the operator can achieve that control very easily and without placing himself in a dangerous position on the truck. It is thought, therefore, that the very considerable value of my invention will be fully appreciated.

Of course, it will be understood that the conception on which my disclosure is based may readily be utilized as a basis for the designing of other particular structures for carrying out the purposes of my invention. It is important, therefore, that the claims be regarded as including such equivalent constructions as do not depart from the spirit and scope of my invention, in order to prevent the appropriation of my invention by those skilled in the art.

I now claim:

1. In a truck of the class described, a traction circuit, a steering handle, means mounting the steering handle for vertical pivoting movement on said truck, means movable incidental to movement of said handle for effecting the opening of said traction circuit when said handle is in a substantially vertical position on its pivot, said traction circuit being closed when said handle moves toward a more horizontal position away from said substantially vertical position, a yielding stop for said handle against which said handle is positioned when in said substantially vertical position, said handle being movable beyond said substantially vertical position against the force of said yielding stop and toward said truck, and means movable incidental to movement of said handle against the force of said yielding stop toward the truck for effecting the closing of said traction circuit.

2. In a truck of the class described, a traction circuit, a steering handle, means mounting the steering handle for vertical pivoting movement on said truck, a cam movable by said handle for effecting the opening of said traction circuit at a control point when said handle is in a substantially horizontal position and in a substantially vertical position on its pivot, said traction circuit being closed at said point when said handle is in a zone between said two positions, a yielding stop for said handle against which said handle is positioned when in said substantially vertical position, said handle being movable beyond said substantially vertical position against the force of said yielding stop and toward said truck, and a cam effecting the closing of said traction circuit upon said movement of said handle toward the truck.

3. In a truck of the class described, a traction circuit, a steering handle, means mounting the steering handle for vertical pivoting movement on said truck, means movable incidental to pivotal movement of said handle for effecting the opening of said traction circuit at a control point when said handle is in a substantially horizontal position and in a substantially vertical position, said traction circuit being closed at said point when said handle is in a zone between said two positions, a yielding stop for said handle against which said handle is positioned when in said substantially vertical position, said handle being movable beyond said substantially vertical position against the force of said yielding stop and toward said truck, and a part of said means movable incidental to pivotal movement of said handle effecting the closing of said traction circuit upon said movement of said handle toward the truck.

4. In a truck of the class described, a traction circuit, a steering handle, means mounting the steering handle for vertical pivoting movement on said truck, means movable incidental to pivotal movement of said handle for effecting the opening of said traction circuit at a control point when said handle is in a substantially horizontal position and in a substantially vertical position, said traction circuit being closed at said point when said handle is in a zone between said two positions, means for holding said handle in said substantially vertical position against movement from said position, said holding means being constructed for permitting predetermined movement of said handle manually beyond said substantially vertical position towards said truck, and a part of said means movable incidental to said predetermined pivotal movement of said handle toward said truck for effecting the closing of said traction circuit.

5. In a truck of the class described, a traction circuit, a steering handle, means mounting the steering handle for vertical pivoting movement on said truck, a cam actuated by the vertical pivoting movements of said handle, a part on said cam acting when said handle is in a substantially horizontal position and in a substantially vertical position to effect the opening of said traction circuit at a control point, said traction circuit being closed at said point when said handle is in a zone between said two positions, a yielding stop for said handle against which said handle is positioned when in said substantially vertical position, said handle being rotatable on its pivot beyond said substantially vertical position against the force of said yielding stop and toward said truck, and a part on said cam effecting the closing of said traction circuit upon said movement of said handle toward the truck.

6. In a truck of the class described, a traction circuit, a steering handle, means mounting the steering handle for vertical pivoting movement on said truck, a cam movable by said handle for effecting the opening of said traction circuit at a control point when said handle is in a substantially vertical position on its pivot, said traction circuit being closed at said point when said handle moves on its pivot from said substantially vertical position toward a horizontal position, means for holding said handle in said substantially vertical position against rotation on its pivot from said position, said means for holding the handle being constructed for permitting predetermined movement of said handle manually beyond said substantially vertical position toward said truck, and a cam effecting the closing of said traction circuit upon said predetermined movement of said handle toward the truck.

7. In a truck of the class described, a traction circuit, a steering handle, means mounting the steering handle for vertical pivoting movement on said truck, means movable by said handle for effecting the opening of said traction circuit at a control point when said handle is in a substantially vertical position on its pivot, said traction circuit being closed at said point when said handle moves on its pivot from said substantially vertical position toward a horizontal position, a yielding stop for said handle against which said handle is positioned when in said substantially vertical position, said handle being movable on its pivot beyond said substantially vertical position against the force of said yielding stop and toward said truck, a limit stop for the movement of said handle toward said truck, and a part of said means movable with said handle effecting the closing of said traction circuit as said handle moves toward said limit stop.

8. In a truck of the class described, a traction circuit, a steering handle, means mounting the steering handle for vertical pivoting movement on said truck, means movable incidental to pivotal movement of said handle for effecting the opening of said traction circuit when said handle is in a substantially vertical position on its pivot, said traction circuit being closed when said handle moves on its pivot from said substantially vertical position toward a horizontal position, means for holding said handle in said substantially vertical position against movement from said position, said holding means being constructed for permitting predetermined movement of said handle manually beyond said substantially vertical position toward said truck, a limit stop for the movement of said handle on its pivot toward said truck, and means movable incidental to pivotal movement of said handle effecting the closing of said traction circuit as said handle moves toward said limit stop.

9. In a truck of the class described, a steering and traction unit, a steering handle mounted for vertical swinging movement on said steering and traction unit, a traction motor on said unit, a switch for opening and closing an electric circuit for said traction motor, means movable with said steering handle for actuating said switch whereby to close said electric circuit as the handle swings from a substantially vertical position toward a horizontal position on its mounting, said circuit being open when the steering handle is in said substantially vertical position, a part of said means actuating said switch whereby to close said electric circuit as the handle moves beyond said substantially vertical position and toward the truck, and manually operated means on said steering handle for controlling said electric circuit when the circuit is closed by said switch.

10. In a truck of the class described, an electric motor for propelling said truck, a source of electric power for said motor, a steering handle for said truck pivotally mounted for vertical swinging movement on said truck, switch means for said electric motor operated by the swinging movement of said steering handle and positioned to maintain said electric motor out of contact with said electric power source when said steering handle is substantially vertical on its pivotal mounting, said switch means adapted to connect said motor to said power source when said steering handle is swung toward a horizontal position, said switch means further adapted to connect said motor to said power source when said steering handle is swung beyond its substantially vertical position and toward the truck, and further switch means at the end of said steering handle the movement of which switch means to a predetermined position is a requisite to the closing of said circuit between said power source and motor by said first switch means.

11. In a truck of the class described, a steering and traction unit having a motor and a steering and traction wheel, a steering handle mounted for vertical swinging movement on said steering and traction unit, a brake for said steering and traction wheel, means movable with said steering handle for moving said brake to a release position as the handle swings from a substantially vertical position toward a horizontal position on its mounting, said brake being in a braking position when the steering handle is in said substantially vertical position, and a part of said means acting to move said brake to release position as the handle moves beyond said substantially vertical position toward the truck.

12. In a truck of the class described, an electric motor for propelling said truck, a circuit for said electric motor having two control points, both of which must be particularly conditioned before said circuit is closed, a steering handle for said truck pivotally mounted thereon for vertical swinging movement, means whereby said steering handle so particularly conditions said circuit at one of said control points when said steering handle is swung from a substantially vertical toward a horizontal position, said circuit being open when said steering handle is in said substantially vertical position, a part of said means effecting the said particular conditioning of said circuit at said one control point when the steering handle is swung beyond said substantially vertical position and toward said truck, and manually operated means on said steering handle for particularly conditioning said circuit at the other of said control points.

13. In a truck of the class described, an electric motor for propelling said truck, a circuit for said electric motor having two control points, both of which must be particularly conditioned before said circuit is closed, a steering handle for said truck pivotally mounted thereon for vertical swinging movement, means whereby said steering handle so particularly conditions said circuit at one of said control points when said steering handle is swung from a substantially vertical toward a horizontal position, a yielding stop for said steering handle against which said handle is positioned when in said substantial vertical position, said circuit being open at said one control point when said steering handle is against said yielding stop, said steering handle adapted by yielding of said yielding stop to swing beyond said substantially vertical position and toward the truck, a limit stop for the swinging of the handle toward the truck, a part of said means effecting the said particular conditioning of said circuit at said one control point as the steering handle in swing toward said limit stop, and manually operated means on said steering handle for particularly conditioning said circuit at the other of said control points.

14. In a truck of the class described, a traction wheel, an electric motor for driving said traction wheel, a brake for said wheel, a circuit for said electric motor having two control points, both of which must be particularly conditioned before said circuit is closed, a steering handle for said traction wheel, means mounting said steering handle for vertical swinging movement relatively to the truck, a cam moving with said steering handle as the handle swings on its mounting, means through which said cam so particularly conditions said circuit at one of said control points when said steering handle is swung from a substantially vertical toward a horizontal position, means whereby said cam acts when so conditioning the circuit to move said brake to a release position, a yielding stop for said steering handle against which said handle is positioned when in said substantially vertical position, said brake being in braking position and said circuit being open at said one control point when said steering handle is against said yielding stop, said steering handle adapted by yielding of said yielding stop to swing beyond said substantially vertical position and toward the truck, a limit stop for the swinging of the steering handle toward the truck, a part of said cam acting as the steering handle is swung toward said limit stop to effect the release of said brake and the said particular conditioning of said circuit at said one control point, and manually operated means on the end of said steering handle for particularly conditioning said circuit at the other of said control points.

15. In a truck of the class described, a steering and traction unit mounted for rotation in a steering axis, a steering handle, means mounting the steering handle for vertical pivoting movement on said steering and traction unit, a traction circuit, means movable incidental to vertical pivoting movement of said handle for effecting the opening of said traction circuit when said handle is in a substantially vertical position, said traction circuit being closed when said handle moves toward a more horizontal position away from said vertical position, a yielding stop for said handle against which said handle is positioned when in said substantially vertical position, said handle being movable beyond said substantially vertical position against the force of said yielding stop and toward the truck, a limit stop against which said handle moves incidental to said movement of the handle toward the truck, and said limit stop arranged in the steering axis of said steering and traction unit whereby to support the handle in that axis as the unit is steered relatively to the truck.

References Cited in the file of this patent

UNITED STATES PATENTS

| | | |
|---|---|---|
| 2,327,583 | Framhein | Aug. 24, 1943 |
| 2,399,605 | Schroeder | Apr. 30, 1946 |
| 2,478,327 | Schreck | Aug. 9, 1949 |
| 2,645,297 | Wennberg et al. | July 14, 1953 |